United States Patent [19]

Attwood et al.

[11] Patent Number: 4,921,922
[45] Date of Patent: May 1, 1990

[54] PRODUCTION OF TETRAFLUOROETHYLENE POLYMERS

[75] Inventors: Terence E. Attwood, Blackpool; Richard F. Bridges, Near Blackpool, both of United Kingdom

[73] Assignee: Imperial Chemical Industries PLC, London, England

[21] Appl. No.: 201,209

[22] Filed: Jun. 2, 1988

Related U.S. Application Data

[62] Division of Ser. No. 118,253, Nov. 9, 1987, Pat. No. 4,766,188.

[30] Foreign Application Priority Data

Nov. 26, 1986 [GB] United Kingdom ............... 8628291

[51] Int. Cl.$^5$ ............................................ C08F 14/18
[52] U.S. Cl. .................................. 526/255; 526/232.3
[58] Field of Search ............................. 526/81, 255

[56] References Cited

U.S. PATENT DOCUMENTS

| | | | |
|---|---|---|---|
| 2,419,008 | 4/1947 | Coffman et al. | 526/81 |
| 2,759,350 | 6/1956 | Kroll | 260/29.6 |
| 3,110,704 | 11/1963 | Halliwell | 526/81 |
| 3,475,391 | 10/1969 | Coker | 526/91 |
| 3,801,552 | 4/1974 | Kewetani et al. | 526/227 |
| 4,342,675 | 8/1982 | Gangal | 526/81 |
| 4,654,406 | 3/1987 | Malhotra | 526/81 |
| 4,766,188 | 8/1988 | Attwood et al. | 526/234 |

FOREIGN PATENT DOCUMENTS

| | | | |
|---|---|---|---|
| 0111339 | 6/1984 | European Pat. Off. | |
| 1107165 | 3/1968 | United Kingdom | 526/81 |

OTHER PUBLICATIONS

Hackh's Chemical Dictionary, pp. 37–40.

*Primary Examiner*—Joseph L. Schofer
*Assistant Examiner*—N. Sarofim
*Attorney, Agent, or Firm*—Cushman, Darby & Cushman

[57] ABSTRACT

Production of coagulated dispersion grades of PTFE using an aqueous emulsion polymerization process which employs an initiator system comprising disuccinic acid peroxide and ammonium sulphite, the latter being added during the course of the polymerization. The resulting polymer can be fabricated into porous products of improved properties.

2 Claims, No Drawings

PRODUCTION OF TETRAFLUOROETHYLENE POLYMERS

This is a division of application Ser. No. 118,253 filed Nov. 9, 1987 now U.S. Pat. No. 4,766,188.

This invention relates to the production of tetrafluoroethylene polymers and in particular to the production of coagulated dispersion grades of tetrafluoroethylene homo- and copolymers suitable for the production of porous materials of improved properties.

The production of homo- and copolymers of tetrafluoroethylene (hereinafter TFE) is normally carried out by two distinct and different types of polymerisation process. In one, termed granular polymerisation, the polymerisation of the TFE (and comonomer, if used) is performed in an aqueous medium in the presence of little or no emulsifying agent under conditions which cause the precipitation of agglomerated particles of up to several hundred microns in diameter. In the other, termed emulsion polymerisation, the polymerisation of the TFE (and comonomer, if used) is carried out in the presence of an emulsifying agent to form a stable aqueous dispersion of the polymer particles which are of colloidal size (sub-micron in diameter). The resulting aqueous latex can be used as such (e.g. in coating applications) or coagulated to a powder and dried before use in subsequent fabrication processes (e.g. paste extrusion when compounded with a suitable lubricating medium). The present invention is concerned with the production of TFE homo- and copolymers made by this second process, termed coagulation dispersion grades (CD grades) for convenience. Also for convenience, the term "homo- and copolymers of TFE" will hereinafter be designated simply as PTFE.

It is known to produce porous materials and articles from PTFE CD grades by means of fabricating the polymer (containing a suitable lubricant, e.g. a hydrocarbon oil such as liquid paraffin, naphtha, or white oil) into a shaped product (e.g. by extrusion or calendering) such as tube, rod or film, and after removing the lubricant (e.g. with solvent or by heating), expanding the so-formed article to form the porous article and sintering. The expansion may be performed at a temperature below the melting point of sintered PTFE (327° C.) followed by sintering of the expanded article at a temperature above melting point, or the expansion and sintering can be effected simultaneously by carrying out the expansion at a temperature above the melting point of unsintered PTFE.

It is desirable for many applications that the porous PTFE article so formed should possess excellent properties, and in particular good mechanical properties (such as tensile strength), a good even appearance, and a good resistance to high temperature (dwell time). Such properties are required, for example, if the porous article is a sheet or film for use as a fabric (e.g. in waterproof garments).

We have now discovered a process for the production of PTFE CD grades which yields a product capable of being fabricated into expanded porous PTFE articles of distinctly superior properties than have hitherto been obtainable.

According to the present invention there is provided a process for the production of a coagulated dispersion (CD) grade tetrafluoroethylene homo- or copolymer (PTFE) which process comprises emulsion polymerising tetrafluoroethylene (TFE), and optionally one or more comonomers, in an aqueous medium in the presence of a surfactant(s) as emulsifying agent and a water-soluble initiator system comprising disuccinic acid peroxide (DSAP) and ammonium sulphite (AMS), the ammonium sulphite being added to the aqueous reaction medium after the start of polymerisation, namely at a conversion within the range 1 to 95%, and the amount of ammonium sulphite employed being within the range 25 to 300% by weight, based on the weight of disuccinic acid peroxide used.

The resulting aqueous latex may thereafter be coagulated and dried as per conventional work-up procedures to form the CD PTFE grade.

There is also provided according to the invention a CD PTFE grade produced using a process as defined above.

By the "conversion" at any stage of the polymerisation is meant in this specification the % by weight of TFE polymerised at that stage based on the total amount of TFE polymerised in the polymerisation reaction.

Apart from the use of the initiator system as defined, the emulsion TFE polymerisation can be (and usually is) performed in a manner conventionally known to the art. Typically, the polymerisation temperature is within the range 55 to 85° C., preferably 60 to 80° C. and the pressure within the range 5 to 40 Kg cm$^{-2}$, preferably 10 to 30 Kg cm$^{-2}$. Typically the polymeristion is carried out in a moderately stirred steel-lined or glass-lined autoclave provided with cooling means. As is usual for such polymerisation reactions, at least part and usually all of the DSAP to be used, together with ingredients such as the emulsifying agent are added to the polymerisation vessel prior to the start of the polymerisation reaction. Polymerisation is effected by pressurizing the vessel with TFE and maintaining a predetermined pressure level or pressure profile within the vessel by further feeding of TFE, either continuously or discontinuously. Polymerisation is normally continued until the desired solids level (i.e. polymer content) of the aqueous polymerisation mixture is reached. In the present invention we have usually taken the polymerisation to about 15 to 35% solids content (based by weight on the total weight of the aqueous polymerisation mixture at the time of measurement).

The emulsifying agent employed may also be added in part (e.g. in one or more further additions) during the polymerisation reaction, in order to preserve latex stability. Typical emulsifying agents that can be used include fluorinated carboxylates having 7 to 20 carbon atoms, such as ammonium perfluorocarboxylates like ammonium perfluorooctanoate; the level employed (in total) is usually in the range 0.1 to 0.5% by weight based on the water charged. Other types of dispersion stabilisers may also be used, e.g. hydrocarbons and halogenated hydrocarbons.

If desired, a paraffin wax which is liquid at the polymerisation temperature may be included in the polymeristion recipe to prevent coagulum formation on the internal surfaces of the polymerisation reactor.

The DSAP is normally employed in an amount within the range 0.002 to 0.08% by weight (preferably 0.005 to 0.02% by weight) based on the weight of water charged. usually this is all added before the commencement of polymerisation although some may be added during the polymerisation.

The AMS used in the process of the invention is added to the polymerisation when the conversion is within the range 1 to 95%, preferably 5 to 80% conversion. If the AMS is added before the attainment of 1% conversion, no noticeable improvement in product properties is achieved and also the polymerisation reaction may be prematurely terminated. Addition of the AMS after 95% conversion also tends not to result in a noticeable improvement in product properties. The amount of AMS to be used in the process should be within the range 25 to 300% (preferably 25 to 150%, and more preferably 50 to 100%) by weight, based on the weight of DSAP used. Addition of less than 25% tends to achieve little or no improvement in product properties while the addition of more than 300% usually results in a premature end to the polymerisation (the reaction being "killed-off" by a too rapid increase in polymerisation rate).

Most preferably, the AMS is added within the conversion range 5 to 80% although some success has also been achieved by delaying addition until 90 to 95% conversion.

The AMS used is usually added in a single shot, although 2 or more separate shots of AMS (e.g. 3 or 4) can also be employed.

The scale of the improvement in the properties of the resulting product from the process of the invention appears to be directly related to the the use of the specific combination of DSAP/AMS (defined above) as the redox initiator system used in the polymerisation. Such an improvement is not for example, achieved if the DSAP used is wholly replaced by a persulphate (K, Na or NH$_4$) since the resulting dispersion is found to be unstable. It may however, be possible to use a combination of DSAP/AMS and a persulphate as the intitiator system. Similarly, a lower or no degree of improvement in product properties is obtained when the AMS is replaced by other compounds used in redox systems such as hydroquinone, ferrous sulphate, and sodium bisulphite (sodium metabisulphite).

The aqueous latex from the TFE polymerisation according to the invention has dispersed PTFE particles therein typically of an average primary particle size within the range 0.1 to 0.5 microns.

It is preferred that the resulting PTFE product has a molecular weight corresponding to a SSG (Standard Specific Gravity) of $\leq 2.150$. By SSG is meant the density of a PTFE polymer after it has been heated above its melting point and then cooled at a prescribed rate (1.5° C./min) through its freezing point. With regard to molecular weight however, we have found that a more reliable indication of this parameter can often be achieved by differential thermal calorimetry (DCS), namely from the ratio of the reheating and cooling peak heights (using given heating and cooling rates over a given temperature range; see following examples).

The PTFE CD grades of the present invention are particularly suitable for fabrication into porous films or film-like articles, rods or tubes, which films rods or tubes have been stretched in their manufacture, either uniaxially or biaxially. Such porous articles are pervious to water-vapour and air and yet are impervious to liquid water. They also possess considerably improved appearance. Moreover, the molecular weight of the PTFE is high, being indicative of excellent mechanical properties and improved dwell time for the resulting articles. The films are very suitable as, or for manufacture into, fabric-based materials such as garments, tenting, separatory membranes and the like.

The present invention is now illustrated by the following examples. Unless otherwise specified, all parts and percentages are on a weight basis. The prefix C for an example denotes a comparative example. In these examples, the following general recipe was employed for TFE polymerisation using an autoclave of 10 litre capacity equipped with a stirrer.

Demineralised water (6 litres) was charged to the autoclave followed by paraffin wax (60 g; melting point 53° C.) and ammonium perfluoroctanoate (9 g). The autoclave was sealed, the stirrer started at 250 r.p.m. and the contents heated to 73° C. When the temperature had reached 73° C., the autoclave was pressurized to 300 p.s.i. (21.09 Kg cm$^{-2}$) with nitrogen and pressure tested. The nitrogen was vented off (with the stirrer having been stopped) and the contents of the autoclave evacuated for 5 minutes to remove oxygen. After 5 minutes, the vacuum was disconnected, the stirrer restarted and the autoclave pressurized to 250 p.s.i. (17.6 Kg cm$^{-2}$) with TFE. Disuccinic acid peroxide (DSAP) was added and the autoclave repressurized with TFE to maintain a working pressure of 270 p.s.i. (18.9 Kg cm$^{-2}$). In separate runs (see below), ammonium sulphite (AMS), hydroquinone, ferrous sulphate, and sodium metabisulphite, were added at various conversions during the polymerisation. Each polymerisation was terminated at approximately 30% solids content to give polymer latices of average particle size about 0.3 microns. At reaction end, the TFE source was disconnected and the autoclave was vented to atmospheric pressure, evacuated, and then flushed three times with nitrogen. The wax was decanted off, and the TFE polymer isolated by coagulation, the polymer was then baked for 8 hours at 200° C. in an oven.

EXAMPLE C1

This was a control employing only DSAP (0.72 g; 0.012% on water charged) for the initiator system. The polymerisation was continued to 31% solids content, corresponding to 2695 g TFE having been reacted. The reaction time was 123 minutes, the peak reaction rate was 2.6 mole/litre/hour, and the rate at reaction end was 1.9 moles/litre/hour.

EXAMPLE 2

In this polymerisation (according to the invention), which was continued to 30% solids content corresponding to 2570 g TFE having been reacted, the initiator system employed was DSAP (0.72 g; 0.012% on water charged) with AMS (50 ppm based on water; 41.7% based on DSAP) being added (after 30 minutes) at 6% solids content, corresponding to 383 g TFE having been reacted (14.9% conversion). The reaction time was 190 minutes, the peak reaction rate was 2.4 moles/litre/hour, and the rate at reaction end was 0.9 moles/litre/hour.

EXAMPLE C3

In this polymerisation (not according to the invention), which was continued to 30% solids content corresponding to 2570 g TFE having been reacted, the initiator system used was DSAP (0.72 g) with sodium metabisulphite (10 ppm based on water) being added (after 16 minutes) at 2% solids content, corresponding to 122 g TFE having been reacted. A further 10 ppm of sodium metabisulphite was added (after 31 minutes) at 6% solids content, corresponding to 383 g TFE having been reacted, since the first addition showed little effect. The reaction time was 128 minutes, the peak reaction rate was 2.5 moles/litre/hour, and the rate at reaction end was 2.0 moles/litre/hour.

EXAMPLE C4

In this polymerisation (not according to the invention), the initiator system used was DSAP (0.72 g) with ferrous sulphate (2 ppm based on water) being added (after 28 minutes) at 6% solids content, corresponding to 383 g TFE having been reacted. The reaction time was 68 minutes, the peak reaction rate was 6.2 moles/litre/hour, and the rate at reaction end was 5.3 moles/litre/hour.

EXAMPLE C5

In this polymerisation (not according to the invention), the initiator system used was DSAP (0.06 g) with hydroquinone (2 ppm based on water) being added (after 48 minutes) at 2% solids content, corresponding to 122 g TFE having been reacted. The reaction time was 167 minutes, the peak reaction rate was 4.2 moles/litre/hour, and the rate at reaction end was 0.8 moles/litre/hour.

The TFE polymers from Examples 1 to 5 were evaluated using the Stretch Test and Differential Scanning Calorimeter (DSC) Test as follows.

Stretch Test 200 g of polymer were sieved through an 8 mesh screen and 43 g Isopar H lubricant (inert hydrocarbon) added. The mix was rolled for 25 minutes, then conditioned for 24 hours at 25° C. The mix was sieved, extruded at 20 mm/min (30° C.) with a reduction ratio of 100:1 through a 2.54 mm die. The extrudate was dried in a vacuum oven for 2 hours at 100° C., then baked for 3 minutes at 190° C. The extrudate was then heated to 300° C. and drawn (6:1) in a tensiometer (Instron) at 17% per second to give a porous product. A 2 cm sample length was used.

DSC Test In a differential scanning calorimeter (Perkin Elmer DSC II), a 10 mg sample of polymer was heated from 280 to 380° C. at 10° C./minute. The sample was cooled to 280° C. at 10° C./minute. and reheated to 380° C. at 10° C./minute. The ratio of reheating and cooling peak heights R/C was measured. This gives an indication of molecular weight; the larger the number, the higher the molecular weight.

The SSG values of the polymers were also determined.

The following results were obtained:

| Source of TFE polymer | Stretch Test | DSC Test (R/C) | SSG |
|---|---|---|---|
| Ex C1 | Very rough; many translucent areas | 1.00 | 2.157 |
| Ex 2 | Very smooth; entirely homogeneous; did not break | 1.25 | 2.149 |
| Ex C3 | Fibrillated (broke into strands) | 1.14 | 2.166 |
| Ex C4 | Gave discoloured polymer when sintered; broke at draw ratio of 4:1 | 0.97 | 2.152 |
| Ex C5 | Somewhat lumpy | 1.05 | 2.148 |

It was thus found that the PTFE made according to invention (Example 2) gave product with the best appearance using the Stretch Test. It also had the highest molecular weight on the balance of the DSC and SSG measurements (highest outright on the DSC Tests; approx. equal highest with Example C5 on SSG measurements).

We claim:

1. A coagulated dispersion grade tetrafluoroethylene homo- or copolymer produced by a process which comprises emulsion polymerising tetrafluoroethylene, or tetrafluoroethylene with one or more comonomers, in an aqueous medium in the presence of a surfactant(s) as emulsifying agent and a water-soluble initiator system comprising disuccinic acid peroxide and ammonium sulphite, the ammonium sulphit- being added to the aqueous reaction medium after the start of polymerisation, namely at a conversion within the range 1 to 95%, and the amount of ammonium sulphite employed being within the range 25 to 300% by weight, based on the weight of the disuccinic acid peroxide used.

2. A coagulated dispersion grade tetrafluoroethylene homo- or copolymer according to claim 1, which is in the form of a fabricated porous product which has been uniaxially or biaxially stretched during its manufacture.

* * * * *